(12) United States Patent
Zidar

(10) Patent No.: US 8,586,513 B2
(45) Date of Patent: Nov. 19, 2013

(54) ANTI-FRICTION COATING

(75) Inventor: Jakob Zidar, Altmuenster (AT)

(73) Assignee: Miba Gleitlager GmbH, Laakirchen (AT)

(*) Notice: Subject to any disclaimer, the term of this patent is extended or adjusted under 35 U.S.C. 154(b) by 308 days.

(21) Appl. No.: 12/928,359

(22) Filed: Dec. 9, 2010

(65) Prior Publication Data

US 2011/0143975 A1    Jun. 16, 2011

(30) Foreign Application Priority Data

Dec. 10, 2009  (AT) ................. A 1957/2009

(51) Int. Cl.
*F16C 33/08*   (2006.01)

(52) U.S. Cl.
USPC .......................................... 508/103; 384/462

(58) Field of Classification Search
USPC .......................................... 508/103; 384/462
See application file for complete search history.

(56) References Cited

U.S. PATENT DOCUMENTS

| | | | |
|---|---|---|---|
| 4,079,720 A * | 3/1978 | Takahashi ................ | 123/193.4 |
| 6,492,039 B2 | 12/2002 | Huhn et al. | |
| 6,575,635 B1 | 6/2003 | Tsuji et al. | |
| 2005/0029675 A1 | 2/2005 | Hua | |
| 2006/0193744 A1 | 8/2006 | Yang | |

FOREIGN PATENT DOCUMENTS

| | | |
|---|---|---|
| DE | 82 06 353 | 5/1983 |
| DE | 197 28 777 | 4/1999 |
| DE | 199 63 385 | 1/2001 |
| DE | 100 54 461 | 5/2001 |
| DE | 202007018616 U1 * | 12/2008 |
| DE | 10 2007 030 017 | 1/2009 |
| DE | 20 2007 018 616 | 1/2009 |
| GB | 2 260 338 | 4/1993 |
| GB | 2 285 059 | 6/1995 |
| GB | 2 375 801 | 11/2002 |
| WO | WO 2006/028668 | 3/2006 |

OTHER PUBLICATIONS

European Search Report in EP 10 19 4019 dated Apr. 4, 2011, with English translation of relevant parts.
Austrian Search Report in A 1957/2009 dated May 31, 2010, with English translation of relevant parts.

* cited by examiner

*Primary Examiner* — Jim Goloboy
(74) *Attorney, Agent, or Firm* — Collard & Roe, P.C.

(57) ABSTRACT

The invention relates to an anti-friction coating (4) made from a tin-based alloy which, in addition to tin, contains at least one other element from the group comprising antimony and copper, optionally lead and/or bismuth, and optionally at least one element form a group comprising zirconium, silicon, zinc, nickel and silver, and the proportion of antimony is at most 20% by weight, the proportion of copper is at most 10% by weight, the total proportion of lead and bismuth is at most 1.5% by weight, the total proportion of copper and antimony is at least 2% by weight and the total proportion of zirconium, silicon, zinc, nickel and silver is at most 3% by weight, and tin is present bonded in the form of inter-metallic phases and freely as a tin phase with beta-tin grains. The tin grains with a beta-tin structure have a mean size in μm which is calculated on the basis of the formula K=A/(S+3*C+O), and the tin grains with a beta-tin structure in the tin-based alloy in any event have a mean grain size of at least 2.5 μm.

15 Claims, 1 Drawing Sheet

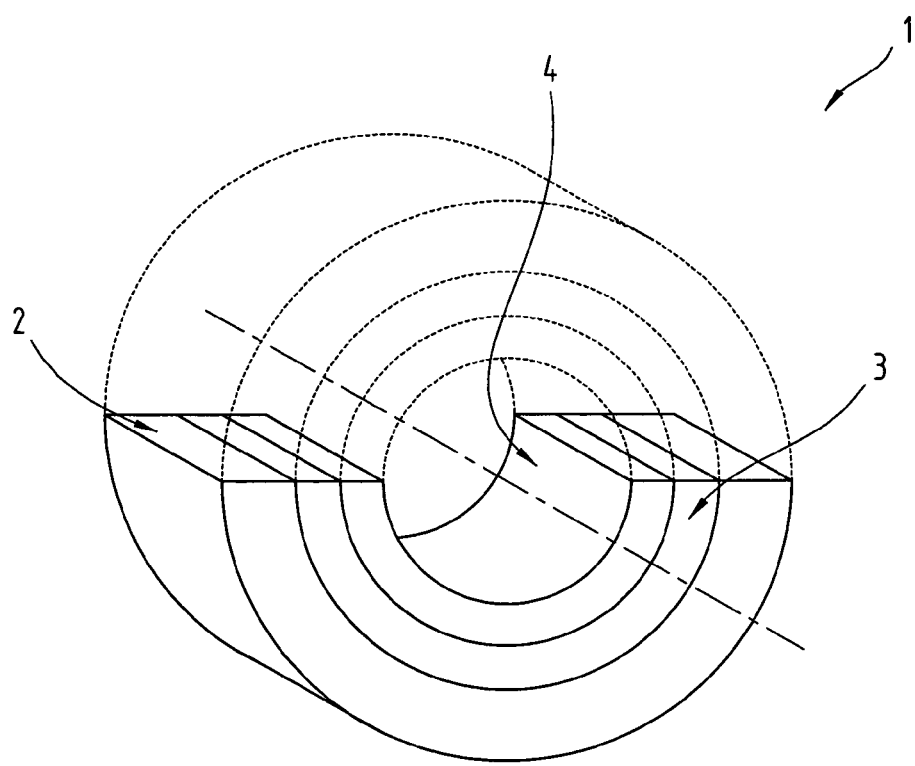

ANTI-FRICTION COATING

CROSS REFERENCE TO RELATED APPLICATIONS

Applicant claims priority under 35 U.S.C. §119 of Austrian Application No. A 1957/2009 filed on Dec. 10, 2009, the disclosure of which is incorporated by reference.

The invention relates to an anti-friction coating for a multi-layered friction bearing made from an alloy with a base of tin which, in addition to tin, contains at least one other element from the group comprising antimony and copper as the main alloying element, optionally lead and/or bismuth, and optionally at least one element from a group comprising zirconium, silicon, zinc, nickel and silver, and unavoidable impurities originating from the elements during the manufacturing process, and the proportion of antimony is at most 20% by weight, the proportion of copper is at most 10% by weight, the total proportion of lead and bismuth is at most 1.5% by weight, the total proportion of copper and antimony is at least 2% by weight and the total proportion of zirconium, silicon, zinc, nickel and silver is at most 3% by weight, and tin is present bonded in the form of inter-metallic phases and freely in the form of a tin phase with beta-tin grains, a multi-layered friction bearing comprising at least one metal base layer, an anti-friction coating and optionally a bearing metal layer disposed between the anti-friction coating and the metal base layer as well as a method of manufacturing the anti-friction coating.

The use of tin-based alloys for anti-friction coatings of multi-layered friction bearings is already known from the prior art.

For example, document DE 82 06 353 U1 describes an anti-friction bearing shell comprising a steel base shell, a bearing layer, optionally one or more binding and/or blocking layers, as well as a galvanically deposited anti-friction coating made from a white metal bearing alloy on a base of tin containing at most 2% by weight Cu, 2 to 18% by weight Sb, 0 to at most 0.6% by weight As, 0 to at most 0.5% by weight Ni and 0 to at most 1.5% by weight Cd.

Document DE 20 2007 018 616 U1 describes an anti-friction element which also has an anti-friction coating galvanically deposited on a base layer made from a tin-based alloy containing 5-20% by weight Sb, 0.5-25% by weight Cu and at most 0.7% by weight Pb. The total content of all the other elements is less than 0.5% by weight. The key feature in this instance is that the tin crystals are predominantly globular in shape.

In the case of the first of the documents mentioned above, DE 82 06 353 U1, a higher proportion of copper represents a disadvantage in terms of the tribological properties of the anti-friction coating, but the teaching disclosed in this document, DE 20 2007 018 616 U1, is explicitly the opposite of this.

To avoid having to reduce the proportion of copper in the anti-friction coating, document GB 2 375 801 A describes a multi-layered bearing with a double-layered anti-friction coating, and the outer partial layer is made from a tin-based alloy containing 0.5-10% by weight Cu and optionally up to 5% by weight Zn, In, Sb or Ag, and the second partial layer lying underneath is made from a tin-based alloy containing 5-20% by weight Cu.

Document DE 10 2007 030 017 B4 discloses an anti-friction coating containing a tin-based alloy for a so-called grooved bearing, and this tin-based alloy is incorporated in the grooves of the anti-friction coating and contains up to 20% by weight Cu and optionally up to 10% by weight Ag and up to 15% by weight Sb.

Document DE 100 54 461 A1 also describes a multi-layered friction bearing with a three-layered anti-friction coating with a base of tin designed to increase resistance to corrosive wear. This tin-based alloy contains at least one metal from a group comprising Cu, Sb, Ag, In, Zn, Ni, Co and Fe in a proportion of up to 30% by weight. Hard particles in the form of nitrides or carbides may also be incorporated in a proportion of up to 25% by vol. The middle layer of the anti-friction coating contains a higher proportion of these additives than the top and bottom partial layers.

Document DE 197 28 777 discloses an anti-friction coating for a multi-layered friction bearing which, in addition to tin, contains between 3 and 20% by weight Cu and optionally up to 20% by weight Bi, Ag or Ni respectively.

In the past, lead coatings have also often been used as anti-friction layers because lead has significant advantages over tin. However, lead is problematic in that it is not environmentally friendly.

The objective of the invention is to propose an anti-friction coating which has a low lead content or is free of lead.

This objective is achieved, independently in each case, by an anti-friction coating of the type outlined above, in which the tin grains based on a beta-tin structure with a mean size with at least a value in μm calculated using the formula $K=A/(S+3*C+O)$, where K stands for the mean grain size in μm, A is a factor, S stands for the alloying proportion of antimony in % by weight, C stands for the total alloy proportion of copper, silver, nickel, and O stands for the total alloy proportion of lead, bismuth, zinc, other alloying elements and non-metallic particles as a % by weight. The factor A has the value 50, in particular 70, preferably 100, and the tin grains with a beta-tin structure in the tin-based alloy in any event have a mean grain size of at least 2.5 μm due to the multi-layered friction bearing described above which is provided with the anti-friction coating proposed by the invention and due to the method of producing the anti-friction coating, whereby an electrolyte is used which has a tin concentration of between 0.1 mol/l and 1 mol/l, an antimony and/or copper concentration of up to at most 0.3 mol/l respectively, and which optionally contains a concentration of lead and/or bismuth of at most 0.1 mol/l respectively, and which optionally contains a concentration of at least one element from the group comprising zirconium, silicon, zinc, nickel and silver of 0.3 mol/l respectively, and the deposition process takes place at a current density of at least 1.2 A/dm².

As proposed by the invention, the tin grains with a beta-tin structure are as big as possible but not bigger than in a tin alloy of the same composition that is not made by a method as proposed by the invention. Due to the larger tin grains, diffusion processes along the grain boundaries are reduced and hence also the associated mechanisms which cause anti-friction bearings to fail, such as creep at the grain boundaries, for example, or a reduction in the copper content, as a result of which the anti-friction bearing is able to remain in operation for longer. In this respect, it should be pointed out that this theory posited by the applicant is not restrictive in any way as regards the invention and is merely an attempt to explain the improved properties of the anti-friction coating. However, this hypothesis has been confirmed several times during the course of testing the anti-friction coatings proposed by the invention.

In order to improve wear resistance still further, i.e. in order to impart greater hardness to the anti-friction coating, it is of advantage if the tin-based alloy is alloyed with at least one element from a group comprising zirconium, silicon, zinc, nickel and silver in a proportion of in total at most 3% by weight. In this respect, the proportion of zirconium may also be at most 1.5% by weight and that of the silicon at most 1.2% by weight.

The concentrations specified above relate to the metal ions or optionally to metals as such, provided they are present as elements or in the form of alloy particles.

At this stage, it should be pointed out that the grains usually have an irregular habitus. For example, tin grains may be more or less globular on the one hand and rod-shaped on the other hand, in other words extend in one direction. In this context, all the transitions between these two extremes are also possible. The expression "biggest dimension" within the meaning of the invention refers to that dimension which is the biggest in terms of its value, in other words in the case of the rod-shaped variant of the tin grains, the dimension in the longitudinal extension. In other words, this expression defines the diameter of the envelope circle or envelope sphere by which a tin grain is enclosed.

The formula makes allowance for the fact that alloying elements added to the tin-based alloy, in other words copper, antimony, lead or bismuth for example, have a grain-refining effect on the beta-tin grains, as a result of which the higher the alloy content of these other alloying elements, the more difficult it becomes to deposit coarse grains or the grains become coarser, e.g. by subjecting the anti-friction coating to heat treatments.

In the context of the invention, the mean grain size refers to the arithmetic mean calculated from the values of the biggest and the smallest dimension of this grain if the grain is considered as a geometric mean, as rendered visible in a cross-section through the grain pattern, and the mean value is calculated on the basis of the biggest visible grain in the grain pattern to the smaller grains until the sum of the cross-sectional surfaces of the grains used to calculate the mean value represents 80% der of the total cross-sectional surface of all the beta-tin grains.

This method makes allowance for the fact that in producing a cross-sectional sample of the grains, grains in the vicinity of the corner points are also cut, thereby reducing their influence on the measurement result.

The grain size determined in this manner usually matches very closely the typical grain size measured on the least representative grains.

Chemical or physical etching processes or electron beam methods (EBSD) may be used as a means of distinguishing beta-tin grains from grains of inter-metallic compounds.

The tin grains with a beta-tin structure in the tin-based alloy preferably have a mean grain size of at least 5 µm, in particular at least 7 µm, more particularly preferably at least 9 µm.

In the case of one variant, the beta-tin grains have a mean grain size within a range of 2.5 µm to 40 µm. Below a grain size of 2.5 µm, the specified effect was not observed to a sufficient degree. Interestingly, however, a worsening of the wear resistance was observed if the mean grain size of the beta-tin grains exceeds 40 µm. It is assumed that a further coarsening of the existing structure leads to excessive abrasion.

Preferred embodiments of the anti-friction coating are those in which the beta-tin grains have a mean grain size within a range of 5 µm to 40 µm, in particular from 10 µm to 40 µm, within the context of the invention.

If the coating thickness of the anti-friction coating is less than 41 µm, it was found that the wear resistance of this anti-friction coating could be improved if the beta-tin grains have a mean grain size in excess of one eighth, preferably one quarter, of the coating thickness of the anti-friction coating. In this case, the effect is preserved, even in the event of the anti-friction coating being partially abraded due to wear over a longer period of time.

In the context of the invention, it is preferable if the proportion of antimony is between 5% by weight and 15% by weight and if the copper content is between 0.5% by weight and 5% by weight. This enabled anti-friction coatings to be produced which, in addition to exhibiting good embedding properties, also offered better wear resistance, even though the beta-tin grains still had the desired advantageous size.

In particular, the proportion of antimony may be between 7% by weight and 12% by weight and the copper content may be between 1% by weight and 3.75% by weight.

Although the intention was to obtain lead-free anti-friction coatings in principle, it was found possible within the context of the invention to opt for a lead content of at most 0.1% by weight, in particular at most 0.05% by weight, which would still be permissible, and these embodiments of the invention may still be considered as lead-free within the meaning of the EU's End-of-Life Vehicles Directive (Directive 2000/53/EC "ELV Directive").

For some applications, however, it has proved to be of advantage if the tin-based alloys have a higher lead content and/or bismuth content, although in such situations, the lead content and/or bismuth content is limited to a value of between 0.2% by weight and 0.5% by weight, in particular to a value of between 0.2% by weight and 0.35% by weight. It is assumed that lead accumulates at the grain boundaries and increases their strength. Bismuth obviously fulfils the same function and may replace the lead in lead-free alloys.

An increase in the lead- and/or bismuth content beyond 1.5% by weight leads to a sharp decrease in the heat resistance of the alloy coating and does not therefore offer any advantages.

One embodiment offers an option whereby zirconium and silicon are not present as elements or as inter-metallic phases and instead, the tin-based alloy also contains oxygen and/or carbon, which means that there are hard particles of $ZrO_2$ and SiC dispersed through the tin-based alloy, which likewise enables the strength of the anti-friction coating to be improved.

In this respect, it is of advantage if these $ZrO_2$ and SiC particles have a mean grain size of between 0.01 µm and 1 µm in order to obtain the desired grain size of the beta-tin grains.

In the case of one embodiment of the multi-layered friction bearing, an intermediate coat is disposed between the bearing metal layer and the anti-friction coating, which comprises one or more partial coatings which are galvanically deposited or applied by diffusion, and each of the partial coatings or the intermediate coating itself contains one or more elements from the group comprising chromium, nickel, iron, cobalt, copper and tin. On this basis, it was possible to obtain better structural hardness of the multi-layered friction bearing, particularly as regards the relatively soft tin-based alloy of the anti-friction coating.

In this respect, it is of advantage if the intermediate coating has a hardness which is at least three times greater than the hardness of the anti-friction coating, and is also greater than the hardness of the base material to which the intermediate coating is applied, thereby resulting in better support for the anti-friction coating on the base so that the anti-friction coating has better tribological properties and is softer.

It is also of advantage if the hardness of the intermediate coating is at least five times greater than the hardness of the anti-friction coating.

Based on one variant of the method for increasing the size of the beta-tin grains, the anti-friction coating applied by galvanic deposition is heat-treated at a temperature selected from a range of between 130° C. and 220° C. for a period selected from a range of between 0.5 h and 100 h.

To provide a clearer understanding, the invention will be explained in more detail with reference to the appended drawing.

It is a schematically simplified drawing illustrating:

FIG. 1 a multi-layered friction bearing in the form of a friction bearing shell;

FIG. 1 shows a cross-section through a multi-layered friction bearing 1 in the form of a friction bearing half-shell. The variant illustrated is a three-layered variant of the multi-layered friction bearing 1, comprising a metal base layer 2, a bearing metal layer 3 and an anti-friction coating 4. The bearing metal layer 3 is disposed between the anti-friction coating 4 and the metal base layer 2.

The main structure of such a three-layered bearing, such as used in automotive vehicles for example, is known from the prior art and therefore requires no further explanation. It should be pointed out, however, that other coatings may be applied, for example a coating to impart adhesion may be applied between the anti-friction coating 4 and the bearing metal layer 3 and/or a diffusion barrier coating, and an adhesive coating may likewise be provided between the bearing metal layer 3 and the metal base layer 2.

Within the context of the invention, the multi-layered friction bearing 1 may also be of a different design, for example a bearing bush, as indicated by broken lines in FIG. 1. Other possible embodiments include synchroniser rings, axially extending sliding blocks or similar.

Another possibility offered within the context of the invention is to dispense with the bearing metal layer 3, in which case the anti-friction coating 4 is applied to the metal base layer 2 either directly or with an adhesive applied in between and/or to apply a diffusion barrier coating to the metal base layer 2. Also within the scope of the invention, direct coatings may be applied, for example for connecting rod eyes, in which case the metal base layer 2 is not necessarily of a layered design.

The metal base layer 2 is usually made from steel or a material which imparts the requisite structural strength to the multi-layered friction bearing 1. Such materials are known from the prior art.

A range of different alloys may be used for the bearing metal layer 3 such as those used as standard for anti-friction bearing elements. Examples of these are bearing metals with a base of aluminum, e.g. AlSn6CuNi, AlSn20Cu, AlSi4Cd, AlCd3CuNi, AlSi11Cu, AlSn6Cu, AlSn40, AlSn25CuMn, AlSi11CuMgNi, AlZn4Si, or bearing metals with a base of copper, e.g. CuSn10, CuAl10Fe5Ni5, CuZn31Si, CuPb24Sn2, CuSn8Bi10, CuSn4Zn.

Naturally, bearing metals other than those listed above may also be used.

As proposed by the invention, the anti-friction coating 4 is made from a tin-based alloy, containing at least one element from a group comprising antimony and copper, and optionally lead and/or bismuth. The proportion of antimony is at most 20% by weight, in particular between 5% by weight and 15% by weight, that of copper at most 10% by weight, in particular between 0.5% by weight and 5% by weight. The total proportion of lead and/or bismuth is at most 1.5% by weight, in particular between 0.2% by weight and 0.5% by weight. If both antimony and copper are used, the total proportion of these elements is at least 2% by weight, in particular between 2% by weight and 22% by weight. In order to obtain lead-free tin-based alloys as proposed by the invention, the lead content is restricted to at most 0.1% by weight, preferably at most 0.05% by weight.

In order to strengthen the tin matrix, another option is for the tin-based alloys at least to contain an element from a group comprising zirconium, silicon, zinc, nickel, and silver, in which case their proportion is limited to at most 3% by weight. In this respect, the zirconium and silicon may not necessarily be present as inter-metallic phases and instead may be in the form of $ZrO_2$ or SiC particles. In this case, it is of advantage if the mean diameter of these particles is limited to 0.01 μm to 1 μm, in particular 0.05 μm to 0.75 μm.

The coating thickness of the anti-friction coating 4 may be between 10 μm and 2000 μm. In this respect, coating thicknesses of between 500 μm and 2000 μm are used if a coating is applied directly to the metal base layer 1, whereas coating thicknesses of between 100 μm and 400 μm are preferably used if the anti-friction coating 4 is used as a replacement for cast white metals on bronze for example, and if using the anti-friction coating 4 as a running layer in bearings made from three materials, it is preferable to opt for coating thicknesses of between 15 μm and 40 μm.

As mentioned above, an intermediate coating may also be applied to the multi-layered friction bearing 1. These intermediate coatings may either comprise a single layer or be made up of several partial coatings. In particular, these intermediate coatings are made from an element from the group comprising chromium, nickel, iron, copper or tin, and mixed variants are also possible, for example it is possible to use intermediate coatings containing at least two of these elements, e.g. chromium and nickel or iron and tin. In the case of intermediate coatings made up of several partial coatings, the proportions in the individual partial coatings may be different, for example the content of hardening alloying elements, namely chromium, nickel, iron, copper may be applied starting from the outermost partial coating underneath the anti-friction coating 4 in the direction towards the bearing metal layer 3 or the metal base layer 2 may have a partial coating which increases towards the (respective) next partial coating, for example in the form of a gradient.

With a view to imparting adhesion, it has proved to be of advantage if a tin coating or a coating of a tin-based alloy is used as the intermediate coating for the multi-layered friction bearing 1 proposed by the invention.

Instead of the specified, preferably intermediate, coatings, it would also be possible to use other coatings known from the prior art.

The intermediate coating or the total of the partial coatings may have a coating thickness of between 0.5 μm and 10 μm, preferably 1 μm respectively 4 μm. It is of particular advantage if this intermediate coating as a whole or at least one of the partial coatings is three times harder than the anti-friction coating 4 and preferably harder than the base material. The anti-friction coating 4 may have a hardness based on Vickers of 10 to 50 for example, so that the intermediate coating or at least one of the partial coatings may have a hardness of HV 80 to HV 300. The level of test force will depend on the coating thickness of the coating to be measured in a manner known per se. Up to a coating thickness of 40 μm, a test force of between 1 Pond and 3 Pond, and between 80 μm and 300 μm a test force of up to 10 Pond is used.

The anti-friction coating 4 is preferably galvanically produced.

To this end, a bimetallic strip made from a steel protective layer and a bearing metal layer 3 is produced first of all and optionally re-shaped and/or processed by removing material.

The anti-friction coating 4 proposed by the invention is deposited on the bearing metal layer 3, for example under the following conditions:

Electrolyte and deposition parameters for SnSb6Cu

| | |
|---|---|
| Sn | 60 g/l (as tin(II)tetrafluoroborate) |
| Sb | 3 g/l (as antimony trifluoride) |
| Cu | 0.5 g/l (as copper(II)tetrafluoroborate |

Stabilizer(s) and base electrolyte(s), conductive salt(s) or complexing agents
Oxidation inhibitor(s)
Additives 1 and/or 2

| | |
|---|---|
| Current density | 3 A/dm$^2$ |
| Temperature | 30° C. |

Electrolyte and deposition parameters for SnSb11Cu4Pb

| | |
|---|---|
| Sn | 50 g/l (as tin(II)tetrafluoroborate) |
| Sb | 6 g/l (as antimony trifluoride) |
| Cu | 4 g/l (as copper(II)tetrafluoroborate |
| Pb | 0.2 g/l (as lead(III)tetrafluoroborate) |

Stabilizer(s) and base electrolyte(s), conductive salt(s) or complexing agents
Oxidation inhibitor(s)
Additives 1 and/or 2

| | |
|---|---|
| Current density | 5 A/dm$^2$ |
| Temperature | 15° C. |

Electrolyte and deposition parameters for SnSb4Cu4Bi

| | |
|---|---|
| Sn | 50 g/l (as tin(II)methane sulphonate) |
| Sb | 5 g/l (as antimony trifluoride) |
| Cu | 4 g/l (as copper(II)methane sulphonate) |
| Bi | 0.2 g/l (as bismuth(III)methane sulphonate) |

Stabilizer(s) and base electrolyte(s), conductive salt(s) or complexing agents
Oxidation inhibitor(s)
Additives 1 and/or 2

| | |
|---|---|
| Current density | 1.5 A/dm$^2$ |
| Temperature | 22° C. |

Tin may be used in the form of tin(II)tetrafluoroborate, tin(II)methane sulphonate, tin(II)sulphate, tin(II)pyrophosphate. Generally speaking, the concentration of tin in the electrolyte may be between 0.1 mol/l and 1 mol/l.

Antimony may be used in the form of antimony(III)tetrafluoroborate, antimony trifluoride, antimony(III)oxide, potassium antimony tartrate. Generally speaking, the concentration of antimony in the electrolyte may be up to 0.3 mol/l.

Copper may be used in the form of copper(II)tetrafluoroborate, copper(II)methane sulphonate, copper(II)sulphate, copper(II)pyrophosphate. Generally speaking, the concentration of copper in the electrolyte may be up to 0.3 mol/l.

Lead may be used in the form of lead(II)tetrafluoroborate, lead(II)methane sulphonate, lead(II)pyrophosphate, lead acetate. Generally speaking, the concentration of lead in the electrolyte may be up to 0.01 mol/l.

Bismuth may be used in the form of bismuth trifluoride, bismuth(III)methane sulphonate, bismuth(III)sulphate, bismuth(III)pyrophosphate. Generally speaking, the concentration of bismuth in the electrolyte may be up to 0.01 mol/l.

Silver may be used in the form of silver tetrafluoroborate, silver methane sulphonate, silver pyrophosphate, silver sulphate. Generally speaking, the concentration of silver in the electrolyte may be up to 0.3 mol/l.

Zinc may be used in the form of zinc(II)tetrafluoroborate, zinc(II)methane sulphonate, zinc(II)sulphate, zinc(II)pyrophosphate. Generally speaking, the concentration of zinc in the electrolyte may be up to 0.3 mol/l.

Nickel may be used in the form of nickel(II)tetrafluoroborate, nickel(II)methane sulphonate, nickel(II)sulphate, nickel(II)pyrophosphate. Generally speaking, the concentration of nickel in the electrolyte may be up to 0.3 mol/l.

Possible stabilisers and base electrolytes, conductive salts or complexing agents are: tetrafluoro-boric acid, fluoride-based acid, methane sulphonic acid, tartaric acid and its alkali and ammonium salts, citric acid and its alkali and ammonium salts, ammonium and alkali pyrophosphates, phosphonic acid and its alkali and ammonium salts, 2.2-ethylene dithiodiethanol, phenol and kresol sulphonic acids, in a total concentration of between 0.2 mol/l and 2 mol/l.

Possible oxidation inhibitors are: resorcinol, hydroquinone, pyrocatechol, pyrogallol, formaldehyde, methanol, in a total concentration of between 0.03 mol/l and 0.3 mol/l.

Possible additives 1 are: phenol phthalein, thiourea and derivatives thereof, alpha or beta naphthol and ethoxylates thereof, alpha and beta naphthol sulphonic acid and ethoxylates thereof, o-toluidine, hydroxyquinoline, lignin sulphonate, butien diol, in a total concentration of between 0.0005 mol/l and 0.05 mol/l, preferably 0.002 mol/l and 0.02 mol/l.

Possible additives 2 are: gelatines, size, non-ionic surfactants, polyethylene glycol and their functionalised derivatives, peptone, glycine, in a total concentration of between 0 g/l-20 g/l.

It would also be possible to use mixtures of the elements of the electrolytes listed above, e.g. at least two salts of a or the respective metal and/or at least two stabilisers and/or at least two oxidation inhibitors and/or at least two additives 1 and/or at least two additives 2.

Zirconium and silicon may be used in the form of $ZrO_2$ or SiC particles with the specified grain size dispersed in the bath.

Zinc, nickel, lead, bismuth, silver and other alloying elements may be added to an appropriate electrolyte in the form of the soluble compounds or complexes listed above and deposited from these. Another way of forming an alloy is by diffusing the elements into the coating or depositing them from particles suspended in the electrolyte.

If an adequate grain size cannot be obtained in the deposited state, another possibility is to subject the anti-friction coating 4 to at least one heat treatment, in particular at a temperature of between 130° C. and 220° C., in particular between 150° C. and 215° C., preferably between 165° C. and 190° C., in other words below the first melting point for the alloy, for a period of between 0.5 h and 100 h, in particular between 1 h and 10 h, preferably between 1.5 h and 4 h, in order to make the tin grains primarily deposited coarser.

The objective of this untypically high heat treatment at a temperature of between 80% and 98%, preferably between 87% and 92%, of the absolute melting temperature of the tin (505 K) is to obtain a constant growth in grains whilst simultaneously reducing the number of grains.

The temperature of the heat treatment is also above the usual temperature which might be anticipated during normal operation when the bearing is fitted in position.

In the case of coatings containing a total proportion of copper, nickel, zinc and silver of more than 3.3% by weight or a total proportion of bismuth and lead of more than 0.9% by weight, it is of advantage to avoid exceeding a temperature of 200° C., preferably 180° C., during a heat treatment. This prevents eutectics forming in alloying elements concentrated at the grain boundaries and melting.

The anti-friction coatings produced in this manner have a pronounced beta-tin phase, in which inter-metallic phases are present with the individual ones of and/or between the other alloying element(s).

As proposed by the invention, the tin grains with a beta-tin structure in the tin-based alloy in any event have a mean grain size of at least 2.5 μm or a mean grain size calculated on the basis of the formula specified above.

The tin grains with a beta-tin structure contained in the tin-based alloy are usually of different grain sizes. The frequency of the occurrence of specific grain sizes conforms more or less to a normal distribution because the variance from the mean value (median) of a plurality of mutually independent coincidental variables is sufficient.

The advantage of the tin-based alloy proposed by the invention is that it has a highest possible mean particle size compared with alloys known from the prior art. In particular, a proportion of at least 70%, by reference to the proportion of the total cross-sectional surface visible in the cross-sectional pattern, preferably at least 90%, of the tin grains have a mean diameter of at least 5 μm. The advantage of this is that if the maximum grain size of the particles conforms to a narrow normal distribution, the variance of the individual grain sizes from the median will be at most ±1.5 μm.

Since the alloying elements added to the tin have the effect of refining the tin grains with a beta-tin structure, one embodiment of the invention is such, in terms of the grain size, that the tin grains with a beta-tin structure have a mean grain size calculated on the basis of the formula $K=A/(S+3*C+O)$, where K stands for the mean grain size in μm, A stands for a factor, S stands for the alloy proportion of antimony as a % by weight, C stands for the total alloy proportion of copper, silver, nickel, and O stands for the total alloy proportion of lead, bismuth, zinc, other alloying elements and non-metallic particles as a % by weight, and the factor A has a value of 50, in particular 70, preferably 100. For example, an alloy of SnSb6Cu1 will result in a mean grain size of at least 5.56 μm (=50/9) respectively 7.8 μm (=70/9) respectively 11.1 μm (=100/9), in the case of an alloy SnSb11Cu4, in a mean grain size of at least 3.0 μm (=70/23) respectively 4.3 μm (=100/23). In the case of the latter of the alloys mentioned above, the value 50 for the factor A is not tenable because it results in a mean grain size which is smaller than the minimum value of the biggest dimension of the tin grains of 2.5 μm.

During tests conducted on the anti-friction coating 4, the following alloy compositions based on the invention were produced as examples. All the figures relating to compositions set out in Tables 1 and 2 below should be read as based on % by weight. The remaining amount to make up 100% by weight is tin in each case. The FIGURE given for the grain size should be construed as meaning the mean grain size.

TABLE 1

| Example | Sb | Cu | Pb | Others | Heat treatment | Grain size beta-tin [μm] | Wear [μm] | Visual evaluation |
|---|---|---|---|---|---|---|---|---|
| 1 | 11 | 3 | 0.2 | | 180° C., 5 h | 4.0 | 3 | 2.5 |
| 2 | 6 | 0.5 | 0.4 | | 215° C., 3 h | 11.0 | 3 | 2.0 |
| 3 | 6 | 0.3 | 0.3 | Zn: 0.1 | 190° C., 10 h | 10.0 | 3 | 2.0 |
| 4 | 6 | 2 | 0.3 | Bi: 0.8 | 135° C., 80 h | 12.0 | 5 | 2.5 |
| 5 | | 4 | <0.05 | Ni: 0.2 | 200° C., 2 h | 8.0 | 4 | 1.5 |
| 6 | | 3 | <0.05 | Bi: 0.25 | None | 6.0 | 2 | 2.0 |
| 7 | 1 | 5 | 0.4 | | 150° C., 2 h | 5.0 | 2 | 2.5 |
| 8 | | 10 | 0.9 | ZrO$_2$: 1.5 | 178° C., 3 h | 7.0 | 2 | 3.0 |
| 9 | 4 | | 1 | SiC: 0.3 | 200° C., 5 h | 9.0 | 3 | 2.5 |
| 10 | 5 | 0.6 | 0.3 | ZrO$_2$: 0.5 | 150° C., 3 h | 8.0 | 3 | 2.0 |
| 11 | 8 | 3.5 | <0.05 | | None | 4.0 | 4 | 3.0 |
| 12 | 9 | 0.8 | <0.05 | Bi: 0.3 Zn: 0.3 | 175° C., 20 h | 6.0 | 4 | 2.5 |
| 13 | 10 | 3 | | Bi: 0.7 | 175° C., 10 h | 5.5 | 3 | 3.0 |
| 14 | 12 | 1.3 | 0.3 | Ag: 1.0 | 150° C., 6 h | 5.0 | 5 | 3.0 |
| 15 | 12 | 5 | 0.4 | | 115° C., 2 h | 3.5 | 4 | 3.0 |
| 16 | 15 | 4 | <0.05 | | 185° C., 4 h | 5.0 | 2 | 1.5 |
| 17 | 19 | 2 | 0.8 | SiC: 1.9 | 168° C., 1 h | 4.0 | 2 | 1.5 |

It should be pointed out that the heat treatment at 115° C. in example 15 is not a heat treatment within the meaning of the invention, namely to make the tin grains coarser, and this heat treatment is effectively carried out for a different purpose.

To permit a comparison, the alloy compositions set out in Table 2 were produced and the deposition took place galvanically in a manner known from the prior art.

TABLE 2 anti-friction coatings based on the prior art

| Example | Sb | Cu | Pb | Others | grain size beta-tin [μm] | Wear [μm] | Visual evaluation |
|---|---|---|---|---|---|---|---|
| I | 6 | 1 | 1 | | 4.0 | 7 | 3.5 |
| II | 5 | 0.6 | 0.2 | ZrO$_2$: 0.4 | 5.0 | 4 | 2.5 |
| III | | 6 | | Zn: 0.8 | 2.0 | 5 | 4.0 |
| IV | | 4 | | | 3.5 | 8 | 3.5 |
| V | | 3 | 0.3 | Ni: 0.5 | 4.0 | 7 | 3.0 |
| VI | | 6 | <0.05 | | 2.0 | 6 | 4.0 |
| VII | 5 | 0.5 | <0.05 | | 7.0 | 9 | 3.5 |

TABLE 2-continued anti-friction coatings based on the prior art

| Example | Sb | Cu | Pb | Others | grain size beta-tin [μm] | Wear [μm] | Visual evaluation |
|---|---|---|---|---|---|---|---|
| VIII | 10 | 4 | 0.4 | | 1.5 | 4 | 4.0 |
| IX | 15 | 2 | 0.1 | | 2.0 | 12 | 5.0 |
| X | | 5 | | Ag: 2 | 2.0 | 3 | 3.5 |
| XI | 8 | 2 | | Bi: 0.5 | 3.0 | 5 | 4.0 |

The test results for examples 1 to 17 and I to XI are also set out in Tables 1 and 2.

Tests were conducted on friction bearing shells of the type illustrated in FIG. 1 made from a steel base layer 2 and a lead bronze bearing metal layer 3 with an anti-friction coating 4 of 25-35 μm coating thickness. The tests on the bearing shells were conducted with a gradually changing load and a specific load amplitude of 60 MPa over 3 million load cycles at a sliding speed of 12 m/s.

After testing, the half-shells were measured and wear of the anti-friction coating 4 thus determined. The fatigue strength of the anti-friction coating 4 was visually assessed.

A mark of 1 to 5 for the visual evaluation covers the state of very good (1: running tracks) to very poor (5: pronounced permanent breaks over a large surface area).

The grain sizes were measured from micrographs taken by light microscopy, and the evaluation was conducted as described above. To this end, micrographs were taken of two planes extending orthogonally with respect to one another.

It is clear that compared with the examples based on the prior art, the anti-friction coatings based on the invention exhibited better values for wear and fatigue strength, particularly in a direct comparison of coatings of the same or similar chemical compositions.

From all the compiled test results, not all of which could be reproduced here, it was found that advantageous anti-friction coatings 4 were obtained in terms of resistance to wear and tendency to seize if the beta-tin grains have a minimum grain size and exceed a specific value of a predominant dimension in at least one direction.

In another embodiment of the invention, the beta-tin grains may have a mean grain size which is at least 50%, preferably at least 100%, in particular at least 200%, bigger than the mean grain size of the inter-metallic phases of the anti-friction coating 4, and the explanations given above with respect to the term "mean" should be applied. This also improves the effects described above.

It is assumed that a further improvement to the tribological properties of the anti-friction coating 4 can be achieved if the tin grains are oriented in at least one crystallographic direction in the anti-friction coating 4.

The embodiments described as examples represent possible variants of the anti-friction coating 4 and multi-layered friction bearing 1, and it should be pointed out at this stage that the invention is not restricted to the variants specifically illustrated. Above all, the compositions set out in Table 1 for anti-friction coatings 4 each constitute the subject matter of independent inventions in each case.

LIST OF REFERENCE NUMBERS

1 Multi-layered friction bearing
2 Metal base layer
3 Bearing metal layer
4 Anti-friction coating

The invention claimed is:

1. Anti-friction coating (4) for a multi-layered friction bearing (1) made from a tin-based alloy which, in addition to tin, contains at least one other element from the group comprising antimony and copper as the main alloying element, optionally lead and/or bismuth, and optionally at least one element from a group comprising zirconium, silicon, zinc, nickel and silver, and unavoidable impurities originating from the elements used to produce it, and the proportion of antimony is at most 20% by weight, the proportion of copper is at most 10% by weight, the total proportion of lead and bismuth is at most 1.5% by weight, the total proportion of copper and antimony is at least 2% by weight and the total proportion of zirconium, silicon, zinc, nickel and silver is at most 3% by weight, and tin is present bonded in the form of inter-metallic phases and freely as a tin phase with beta-tin grains, wherein the tin grains with a beta-tin structure have a mean size with at least a value in pm calculated on the basis of the formula $K=A/(S+3*C+O)$, where K stands for the mean grain size in μm, A stands for a factor, S stands for the proportion of antimony in the alloy as a % by weight, C stands for the total proportion of copper, silver, nickel in the alloy and O stands for the total alloy proportion of lead, bismuth, zinc, other alloying elements and non-metallic particles as a % by weight, and the factor A has the value 50, and the mean grain size denotes the arithmetic mean of the values calculated taking each grain as a geometric mean of the biggest and the smallest dimension of this grain as visible in a grain pattern, and the calculation is repeated to determine the biggest grain perceptible in the pattern through to smaller grains until the sum of the cross-sectional surfaces of the grains used to determine the mean represent 80% of the total cross-sectional surface of all the beta-tin grains, and the tin grains with a beta-tin structure in the tin-based alloy in any event have a mean grain size of at least 2.5 μm.

2. Anti-friction coating (4) as claimed in claim 1, wherein the tin grains with a beta-tin structure have a mean grain size in a range of 2.5 μm to 40 μm.

3. Anti-friction coating (4) as claimed in claim 1, wherein the tin grains with a beta-tin structure have a mean grain size which is greater than one eighth of the coating thickness of the anti-friction coating if it is less than 41 μm, and the mean grain size is the arithmetic mean obtained from at least five individual values for the biggest dimension of the tin grain.

4. Anti-friction coating (4) as claimed in claim 1, wherein the proportion of antimony is between 5% by weight and 15% by weight.

5. Anti-friction coating (4) as claimed in claim 1, wherein the copper content is between 0.5% by weight and 5% by weight.

6. Anti-friction coating (4) as claimed in claim 1, wherein the lead content and/or bismuth content is between 0.2% by weight and 0.5% by weight.

7. Anti-friction coating (4) as claimed in claim 1, wherein the lead content is at most 0.1% by weight.

8. Anti-friction coating (4) as claimed in claim 1, wherein zirconium and silicon is or are present in the form of $ZrO_2$ or SiC particles in the tin-based alloy.

9. Anti-friction coating (4) as claimed in claim 8, wherein the $ZrO_2$ and SiC particles have a mean size of between 0.01 μm and 1 μm.

10. Multi-layered friction bearing (1) comprising at least one metal base layer (2), an anti-friction coating (4) and optionally a bearing metal layer (3) disposed between the anti-friction coating (4) and the metal base layer (2), wherein the anti-friction coating (4) is as claimed in claim 1.

11. Multi-layered friction bearing (1) as claimed in claim 10, wherein an intermediate coating is disposed between the bearing metal layer (3) and the anti-friction coating (4), which is made up of one or more partial coatings which are galvanically deposited or formed by diffusion, and each of the partial coatings contains one or more elements from the group comprising chromium, nickel, iron, cobalt, copper and tin.

12. Multi-layered friction bearing (1) as claimed in claim 11, wherein the intermediate coating has a hardness that is at least three times higher than the hardness of the anti-friction coating(4).

13. Anti-friction coating (4) as claimed in claim 1, wherein the factor A has the value 70.

14. Anti-friction coating (4) as claimed in claim 1, wherein the factor A has the value 100.

15. Multi-layered friction bearing (1) as claimed in claim 12, wherein the intermediate coating has a hardness that is higher than that of the base material.

\* \* \* \* \*

UNITED STATES PATENT AND TRADEMARK OFFICE
CERTIFICATE OF CORRECTION

PATENT NO.         : 8,586,513 B2
APPLICATION NO.    : 12/928359
DATED              : November 19, 2013
INVENTOR(S)        : Zidar Page 1 of 1

It is certified that error appears in the above-identified patent and that said Letters Patent is hereby corrected as shown below:

In the Claims

Column 12, line 18 (line 17 of Claim 1) change "pm" to read: "μm".

Signed and Sealed this
Eleventh Day of March, 2014

Michelle K. Lee
*Deputy Director of the United States Patent and Trademark Office*